United States Patent
Real

[19]

[11] Patent Number: 5,918,605
[45] Date of Patent: Jul. 6, 1999

[54] MANICURE STATION

[76] Inventor: Eva Del Real, 2454 Alvarado Dr., Santa Clara, Calif. 95051

[21] Appl. No.: 09/176,849

[22] Filed: Oct. 22, 1998

[51] Int. Cl.$^6$ .......................... A45D 29/00; A45D 29/18; A45D 29/20
[52] U.S. Cl. ................ 132/73; 132/73.5; 132/75
[58] Field of Search ............... 132/73, 73.5, 75, 132/314, 316, 317, 315

[56] References Cited

U.S. PATENT DOCUMENTS

| 1,500,649 | 7/1924 | Simonson | 132/73.5 |
|---|---|---|---|
| 1,602,957 | 10/1926 | Weigel | 132/314 |
| 2,136,843 | 11/1938 | Dinkel | 132/314 |
| 2,563,315 | 8/1951 | Uyl | 132/73.5 |
| 4,280,519 | 7/1981 | Chapman | 132/73.5 |
| 4,321,935 | 3/1982 | Sussman | 132/73 |
| 4,324,050 | 4/1982 | Weir | 33/488 |
| 5,787,903 | 8/1998 | Blackshear | 132/73.5 |

Primary Examiner—John J. Wilson
Assistant Examiner—Trang Doan

[57] ABSTRACT

A manicure station for providing an area for performing manicures. The manicure station includes a base with a pair of pivot arms upwardly extending from the base. A stage extends between the pivot arms and a magnifying assembly is pivotally mounted to the pivot arms. A pair of compartments for holding items therein are provided on the base.

6 Claims, 2 Drawing Sheets

MANICURE STATION

BACKGROUND OF THE INVENTION

1. Field of the Invention

The present invention relates to manicure accessories and aids and more particularly pertains to a new manicure station for providing an area for performing manicures.

2. Description of the Prior Art

The use of manicure accessories and aids is known in the prior art. More specifically, manicure accessories and aids heretofore devised and utilized are known to consist basically of familiar, expected and obvious structural configurations, notwithstanding the myriad of designs encompassed by the crowded prior art which have been developed for the fulfillment of countless objectives and requirements.

Known prior art manicure accessories and aids include U.S. Pat. No. 2,245,929; U.S. Pat. No. 2,468,248; U.S. Pat. No. Des. 300,268; U.S. Pat. No. Des. 318,934; U.S. Pat. No. 1,960,119; and U.S. Pat. No. 2,461,177.

While these devices fulfill their respective, particular objectives and requirements, the aforementioned patents do not disclose a new manicure station. The inventive device includes a base with a pair of pivot arms upwardly extending from the base. A stage extends between the pivot arms and a magnifying assembly is pivotally mounted to the pivot arms. A pair of compartments for holding items therein are provided on the base.

In these respects, the manicure station according to the present invention substantially departs from the conventional concepts and designs of the prior art, and in so doing provides an apparatus primarily developed for the purpose of providing an area for performing manicures.

SUMMARY OF THE INVENTION

In view of the foregoing disadvantages inherent in the known types of manicure accessories and aids now present in the prior art, the present invention provides a new manicure station construction wherein the same can be utilized for providing an area for performing manicures.

The general purpose of the present invention, which will be described subsequently in greater detail, is to provide a new manicure station apparatus and method which has many of the advantages of the manicure accessories and aids mentioned heretofore and many novel features that result in a new manicure station which is not anticipated, rendered obvious, suggested, or even implied by any of the prior art manicure accessories and aids, either alone or in any combination thereof.

To attain this, the present invention generally comprises a base with a pair of pivot arms upwardly extending from the base. A stage extends between the pivot arms and a magnifying assembly is pivotally mounted to the pivot arms. A pair of compartments for holding items therein are provided on the base.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new manicure station apparatus and method which has many of the advantages of the manicure accessories and aids mentioned heretofore and many novel features that result in a new manicure station which is not anticipated, rendered obvious, suggested, or even implied by any of the prior art manicure accessories and aids, either alone or in any combination thereof.

It is another object of the present invention to provide a new manicure station which may be easily and efficiently manufactured and marketed.

It is a further object of the present invention to provide a new manicure station which is of a durable and reliable construction.

An even further object of the present invention is to provide a new manicure station which is susceptible of a low cost of manufacture with regard to both materials and labor, and which accordingly is then susceptible of low prices of sale to the consuming public, thereby making such manicure station economically available to the buying public.

Still yet another object of the present invention is to provide a new manicure station which provides in the apparatuses and methods of the prior art some of the advantages thereof, while simultaneously overcoming some of the disadvantages normally associated therewith.

Still another object of the present invention is to provide a new manicure station for providing an area for performing manicures.

Yet another object of the present invention is to provide a new manicure station which includes a base with a pair of pivot arms upwardly extending from the base. A stage extends between the pivot arms and a magnifying assembly is pivotally mounted to the pivot arms. A pair of compartments for holding items therein are provided on the base.

Still yet another object of the present invention is to provide a new manicure station that has a pivotally mounted magnifying glass so that manicurists may easily see the nails they are manicuring.

Even still another object of the present invention is to provide a new manicure station that has an adjustable stage which can be raised and lowered to accommodate the needs of the manicurist.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
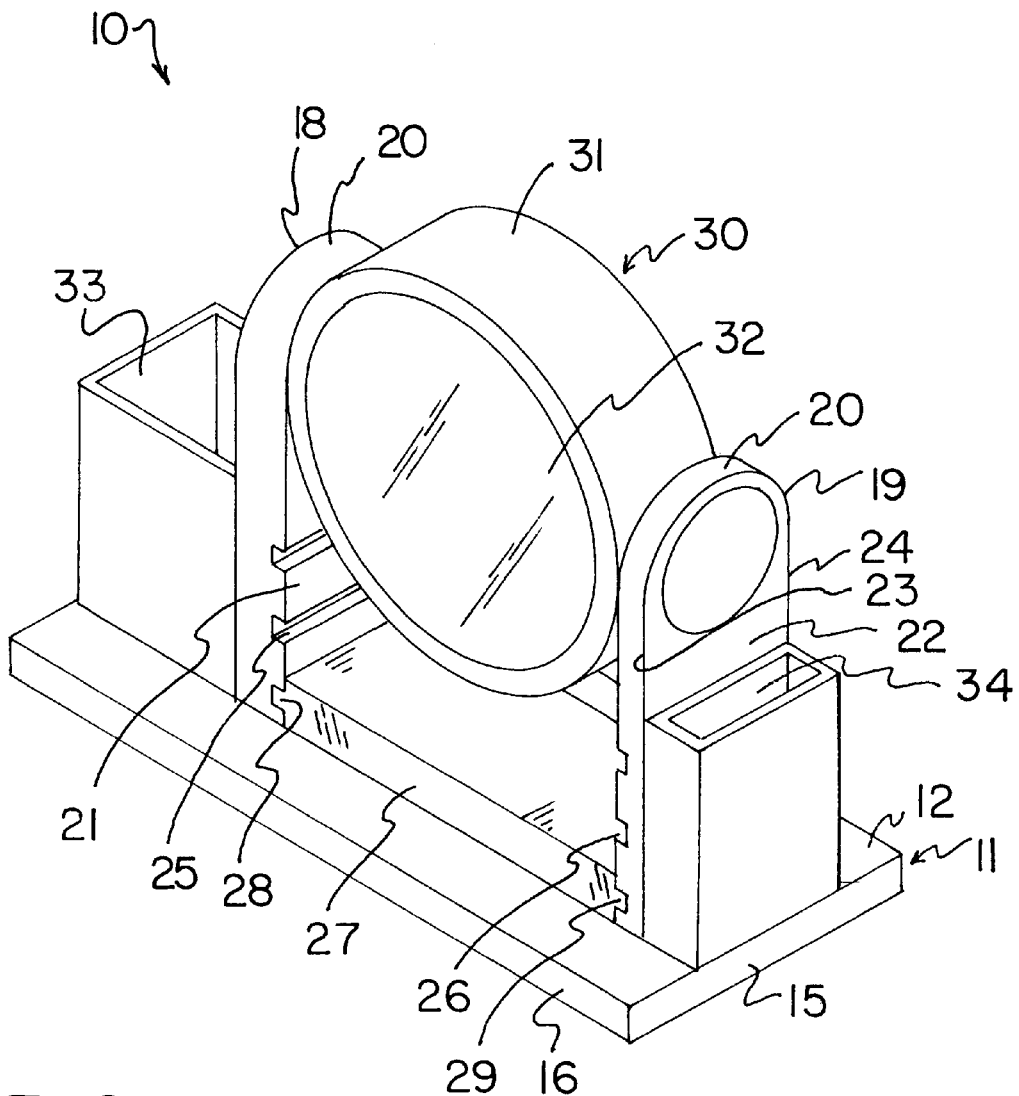
FIG. 1 is a schematic perspective view of a new manicure station according to the present invention.
Figure 2:
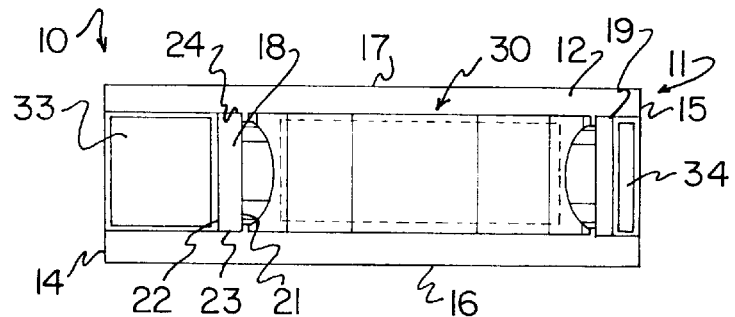
FIG. 2 is a schematic top view of the present invention.
Figure 4:
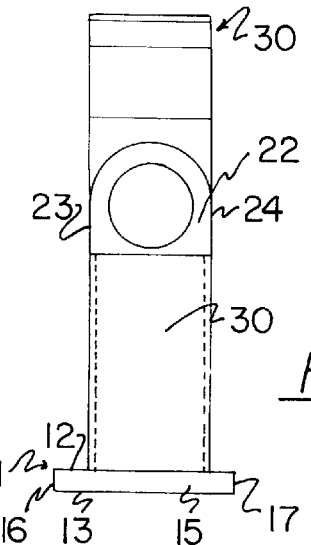
FIG. 4 is a schematic end view of the present invention.
Figure 3:
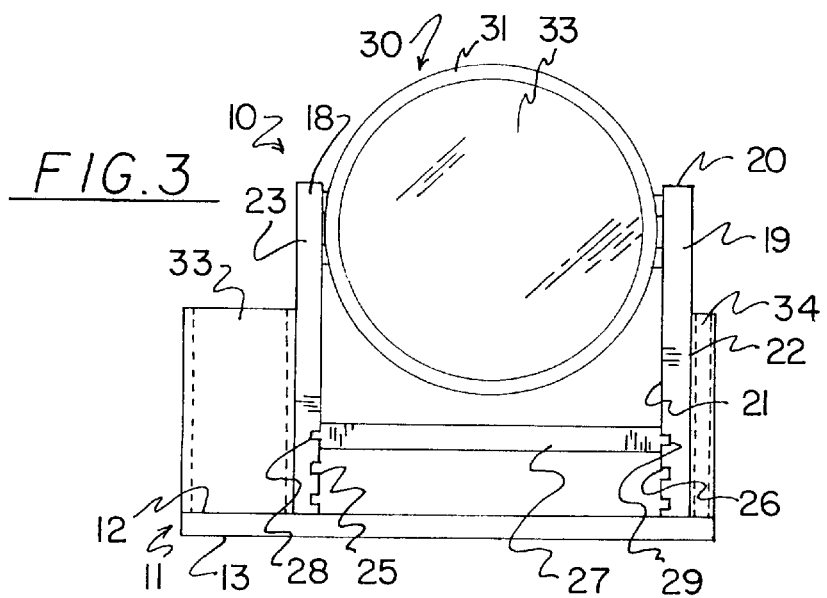
FIG. 3 is a schematic side view of the present invention.

With reference now to the drawings, and in particular to FIGS. 1 through 4 thereof, a new manicure station embodying the principles a and concepts of the present invention and generally designated by the reference numeral 10 will be described.

As best illustrated in FIGS. 1 through 4, the manicure station 10 generally comprises a base 11 with a pair of pivot arms 18,19 upwardly extending from the base 11. A stage 27 extends between the pivot arms 18,19 and a magnifying assembly 30 is pivotally mounted to the pivot arms 18,19. A pair of compartments 33,34 for holding items therein are provided on the base 11.

In closer detail, the manicure station 10 is designed for performing manicures. Specifically, the base 11 is designed for resting on a surface such as a table top. The base 11 is generally rectangular and has substantially planar top and bottom surfaces 12,13, a pair of generally straight end edges 14,15, and a pair of generally straight side edges 16,17 extending between the end edges 14,15 of the base 11. The base 11 has a length defined between the end edges 14,15 of the base 11, a width defined between the side edges 16,17 of the base 11, and a thickness defined between the top and bottom surfaces 12,13 of the base 11. The length of the base 11 is preferably at least two times greater than the width of the base 11. Even more preferably, the length of the base 11 is about three times greater than the width of the base 11. In an ideal illustrative embodiment, the length of the base 11 is about 9 inches and the width of the base 11 is about 3 inches.

The pair of pivot arms 18,19 are upwardly extended from the top surface 12 of the base 11. The pivot arms 18,19 are spaced apart from one another. In the ideal illustrative embodiment, the pivot arms 18,19 are spaced apart about 6 each from each other. The pivot arms 18,19 are preferably positioned on the top surface 12 of the base 11 along a midline between the side edges 16,17 of the base 11. The pivot arms 18,19 each have an upper end 20 and a longitudinal axis extending between the upper end 20 of the respective pivot arm and the upper surface of the base 11. Ideally, the upper end 20s of the pivot arms 18,19 are rounded. Preferably, the longitudinal axes of the pivot arms 18,19 are extended generally parallel to one another and generally perpendicular to the top surface 12 of the base 11.

Each of the pivot arms 18,19 preferably has a pair of side faces 21,22, and a pair of end faces 23,24. The side faces 21,22 of the pivot arms 18,19 preferably lie in generally parallel planes to one another and generally parallel to the end edges 14,15 of the base 11. The end faces 23,24 of the pivot arms 18,19 preferably lie in planes generally parallel to one another and generally parallel to the side edges 16,17 of the base 11. One side face of the side faces of each of the pivot arms facing one another.

The one side face of each of pivot arms 18,19 has a plurality of spaced apart elongate grooves 25,26 therein. Each of the grooves has a length extending between the end faces 23,24 of the respective pivot arm. Each groove has a generally rectangular transverse cross section taken substantially perpendicular to the length of the respective groove. Each groove in one of the pivot arms is associated with a groove in the other of the pivot arms such that each groove of the one pivot arm is paired with the associated groove of the other pivot arm. Preferably, each pair of associated grooves 25,26 lies in a plane generally parallel to the other pair of associated grooves. The planes of the pairs of associated grooves are ideally generally parallel to the top surface 12 of the base 11. The pairs of associated grooves are spaced apart at generally equal intervals along the longitudinal axes of the pivot arms 18,19.

The stage 27 is designed for resting thereon the fingertips of a person having a manicure. The stage 27 has substantially planar upper and lower surfaces, and a pair of opposite ends and a pair of sides extending between the ends of the stage 27. Each of the ends of the stage 27 has an elongate tongue 28,29 extending therefrom. Each tongue has a length extending between the sides of the stage 27. The tongues 28,29 is inserted into an associated pair of grooves such that the stage 27 extends between the pivot arms 18,19. The tongues 28,29 each have a generally rectangular transverse cross section taken perpendicular to their length complementary to the cross sections of the grooves such that tongues 28,29 are slidably insertable into each associated pair of grooves. This allows a user to raise and lower the position of the stage to the ideal height for the manicurist.

The pivot arms 18,19 each have a width defined between the end faces 23,24 of the respective pivot arm and a thickness defined between the side faces 21,22 of the respective pivot arm. The pivot arms 18,19 are preferably of about equal dimensions. In the ideal illustrative embodiment, the width of each pivot arm is about 2 inches such that there is about ½ inch between each end face of the pivot arms 18,19 and the respective adjacent side edge of the base 11. The stage 27 has a length defined between the ends of the stage 27 and a width defined between the sides of the stage 27. Ideally, the width of the stage 27 is about equal to the width of each of the pivot arms 18,19 such that the sides of the stage 27 are flush with the end faces 23,24 of the pivot arms 18,19.

The magnifying assembly 30 is designed for magnifying the view of a person working on fingertips resting on the stage 27. The magnifying assembly 30 is pivotally mounted to the pivot arms 18,19 preferably adjacent the upper ends 20 of the pivot arms 18,19. The magnifying assembly 30 preferably comprises an open outer housing 31 around a magnifying glass 32 with the outer housing 31 pivotally mounted to each of the pivot arms 18,19. In the ideal illustrative embodiment, the magnifying assembly 30 is generally disk-shaped although it may optionally be configured in other shapes including rectangular and triangular. The magnifying assembly 30 has first and second faces, and a thickness defined between the first and second faces of the magnifying assembly 30. Ideally, the thickness of the magnifying assembly 30 is about equal to the width of the pivot arms 18,19. Optionally, the magnifying assembly 30 may include a light source for shining light on the stage 27 during use to further aid the visibility of the user.

A pair of perimeter side walls upwardly extend from the top surface 12 of the base 11 to define the compartments 33,34 for holding items therein such as files, manicure tools, and nail polish bottles. The perimeter side walls each have an top edge defining an opening into the compartment of the respective perimeter side wall. The compartments 33,34 preferably each have a generally rectangular cross section taken generally parallel to the plane of the top surface 12 of the base 11. One of the compartments is positioned between one of the end edges of the base and an adjacent first pivot arm while another of the compartments is positioned between another of the end edges of the base and an adjacent second pivot arm. Ideally, one of the compartments defines a spaced has a larger volume than the spaced defined by the other compartment. Each of the compartments 33,34 preferably has a width equal to the widths of the pivot arms 18,19 such that the compartments are flush with the end faces 23,24 of the pivot arms 18,19.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A manicure station, comprising:
   a base;
   a pair of pivot arms being upwardly extended from said base, said pivot arms being spaced apart from one another;
   a stage extending between said pivot arms;
   each of said pivot arms having a row of grooves facing one another;
   said stage having a pair of elongate tongues extending therefrom, one of said tongues of said stage being inserted into one of said groves of a first of said pivot arms and the other of said tongues of said stage being inserted into one of said grooves of a second of said pivot arms; a magnifying assembly being pivotally mounted to said pivot arms; and a pair of compartments for holding items therein being provided on said base.

2. The manicure station of claim 1, wherein said base has a length defined between a pair of end edges of said base, and a width defined between a pair of side edges of said base, wherein said length of said base being at least two times greater than said width of said base.

3. The manicure station of claim 2, wherein said length of said base is about three times greater than said width of said base.

4. The manicure station of claim 1, wherein said pivot arms each having an upper end and a longitudinal axis extending between the upper end of the respective pivot arm and said upper surface of said base, said longitudinal axes of said pivot arms being extended generally parallel to one another and generally perpendicular to said base.

5. A manicure station, comprising:
   a base;
   a pair of pivot arms being upwardly extended from said base, said pivot arms being spaced apart from one another;
   a stage extending between said pivot arms;
   a magnifying assembly being pivotally mounted to said pivot arms;
   a pair of compartments for holding items therein being provided on said base;
   wherein said pivot arms each have an upper end and a longitudinal axis extending between said upper end of the respective pivot arms and said upper surface of said base, said longitudinal axes of said pivot arms being extended generally parallel to one another and generally perpendicular to said base; and
   wherein each of said pivot arms has a row of grooves facing one another, each groove in one of said pivot arms being associated with a groove in the other of said pivot arms such that each groove of said one pivot arm is paired with the associated groove of the other pivot arm, wherein said stage has a pair of elongate tongues extending therefrom, said tongues being inserted into an associated pair of grooves such that said stage extends between said pivot arms.

6. A manicure station for performing manicures, comprising:
   a base being generally rectangular and having substantially planar top and bottom surfaces, a pair of generally straight end edges, and a pair of generally straight side edges extending between said end edges of said base, said base having a length defined between said end edges of said base, a width defined between said side edges of said base, and a thickness defined between said top and bottom surfaces of said base;
   wherein said length of said base is about 9 inches and said width of said base is about 3 inches;
   a pair of pivot arms being upwardly extended from said top surface of said base, said pivot arms being spaced apart from one another, said pivot arms each having an upper end and a longitudinal axis extending between the upper end of the respective pivot arm and said upper surface of said base;
   said pivot arms being positioned on said top surface of said base along a midline between said side edges of said base;
   wherein said upper ends of said pivot arms are rounded;
   said longitudinal axes of said pivot arms being extended generally parallel to one another and generally perpendicular to said top surface of said base;
   each of said pivot arms having a pair of side faces, and a pair of end faces, said side faces of said pivot arms lying in generally parallel planes to one another and generally parallel to said end edges of said base, said end faces of said pivot arms lying in planes generally parallel to one another and generally parallel to said side edges of said base;

one side face of said side faces of each of said pivot arms facing one another;

said one side face of each of pivot arms having a plurality of spaced apart elongate grooves therein, each of said grooves having a length extending between said end faces of the respective pivot arm, each groove having a generally rectangular transverse cross section taken substantially perpendicular to the length of the respective groove;

each groove in one of said pivot arms being associated with a groove in the other of said pivot arms such that each groove of said one pivot arm is paired with the associated groove of the other pivot arm;

each pair of associated grooves lying in a plane generally parallel to the other pair of associated grooves, said planes of said pairs of associated grooves being generally parallel to said top surface of said base;

said pairs of associated grooves being spaced apart at generally equal intervals along said longitudinal axes of said pivot arms;

a stage having substantially planar upper and lower surfaces, and a pair of opposite ends and a pair of sides extending between said ends of said stage;

each of said ends of said stage having an elongate tongue extending therefrom, each tongue having a length extending between said sides of said stage, said tongues being inserted into an associated pair of grooves such that said stage extends between said pivot arms;

said tongues each having a generally rectangular transverse cross section complementary to said cross sections of said grooves such that tongues are slidably insertable into each associated pair of grooves;

said pivot arms each having a width defined between said end faces of the respective pivot arm and a thickness defined between said side faces of the respective pivot arm, said pivot arms being of about equal dimensions, wherein said width of each pivot arm is about 2 inches;

said stage having a length defined between said ends of said stage and a width defined between said sides of said stage;

wherein said width of said stage is about equal to said width of each of said pivot arms;

a magnifying assembly being pivotally mounted to said pivot arms adjacent said upper ends of said pivot arms, said magnifying assembly comprising an open outer housing around a magnifying glass, said outer housing being pivotally mounted to each of said pivot arms;

wherein said magnifying assembly is generally disk-shaped;

wherein said magnifying assembly has first and second faces, said magnifying assembly having a thickness defined between said first and second faces of said magnifying assembly, wherein said thickness of said magnifying assembly is about equal to said width of said pivot arms;

a pair of perimeter side walls upwardly extending from said top surface of said base, each of said perimeter side walls defining a compartment for holding items therein, said perimeter side wall having an top edge defining an opening into the compartment of the respective perimeter side wall;

said compartments each having a generally rectangular cross section; and one of said compartment being positioned between one of said end edges of said base and an adjacent first pivot arm, another of said compartments being positioned between another of said end edges of said base and an adjacent second pivot arm.

* * * * *